United States Patent [19]

Peschel

[11] 4,330,818

[45] May 18, 1982

[54] VARIABLE VOLTAGE DIRECT CURRENT POWER SUPPLY AND MOTOR SPEED CONTROL

[76] Inventor: Stanley G. Peschel, Minor Rd., Brewster, N.Y. 10509

[21] Appl. No.: 122,189

[22] Filed: Feb. 19, 1980

[51] Int. Cl.$^3$ .............................................. H02M 7/06

[52] U.S. Cl. ...................................... 363/126; 363/53; 363/70; 323/344; 323/340; 318/344

[58] Field of Search ............................. 363/67, 69-70, 363/52-53, 126; 323/43.5 R, 45-47, 340-344; 336/148, 149, 150; 318/343, 344, 345 F, 348-349, 351, 354, 530, 531

[56] References Cited

U.S. PATENT DOCUMENTS

| | | | |
|---|---|---|---|
| 2,926,295 | 2/1960 | Allen | 318/345 X |
| 2,967,270 | 1/1961 | Drenning | 318/344 X |
| 3,089,074 | 5/1963 | Vaughan | 363/126 |
| 3,154,731 | 10/1964 | Sussman et al. | 318/344 X |
| 3,663,828 | 5/1972 | Low et al. | 363/70 X |
| 3,820,002 | 6/1974 | Wildi | 363/126 X |
| 3,921,055 | 11/1975 | Dorsey | 323/43.5 R |
| 4,045,708 | 8/1977 | Neal | 363/126 X |
| 4,189,672 | 2/1980 | Peschel | 323/43.5 R |

*Primary Examiner*—William M. Shoop
*Assistant Examiner*—Peter S. Wong
*Attorney, Agent, or Firm*—Parmelee, Johnson, Bollinger & Bramblett

[57] ABSTRACT

A continuously variable voltage direct current power supply having first and second output terminals is provided using a variable transformer with a core of magnetically permeable material encircled by at least one electrical winding, with segments of winding turns being exposed along two spaced traverse paths. First and second electrically conductive brushes are simultaneously movable along these respective paths, with at least one brush at all times contacting an exposed segment. Rectifiers connect the first brush to the first output terminal and the second output terminal to said first brush. Rectifiers connect the second brush to the first output terminal and the second output terminal to said second brush. Rectifiers connect a winding terminal to the first output terminal and the second output terminal to said winding terminal. Turn-to-turn short-circuit AC current between the adjoining turns contacted by the brushes is eliminated by employing a transformer winding having a turn-to-turn voltage which is less than the forward turnon voltage through two or more rectifiers. Turn-to-turn current can only flow from one brush to the other through at least two rectifiers plus the resistance of the electrical load. The variable transformer may include both primary and secondary windings or be an autotransformer. Single-phase or multi-phase variable transformers can be used, and advantageous DC power control is effectuated considerably more economically than heretofore, for example, to control the speed of large (multiple Horse Power) DC motors.

5 Claims, 7 Drawing Figures

VARIABLE VOLTAGE DIRECT CURRENT POWER SUPPLY AND MOTOR SPEED CONTROL

FIELD OF THE INVENTION

This invention relates to a continuously variable voltage direct current power supply and also relates to an advantageous DC power control, for example, to control the speed of large DC motors.

BACKGROUND

In conventional transformer structures one or more windings each having a predetermined number of turns are wound about a ferromagnetic core. By applying an alternating current to one of the windings a changing magnetic flux is produced in the core generating an electromotive force in the winding(s) with a potential difference occurring between each turn. The potential differences between the turns are cumulative along the length of each winding. The output of the transformer is taken across a portion or all of the sole winding, if an autotransformer having a single winding is used, or across a portion or all of a secondary winding, if the transformer consists of primary and secondary windings. In order to vary the voltage output of the transformer an inductive regulator may be used which effectively varies the magnetic coupling between respective windings or a slidable brush arrangement may be provided in which a brush is slidable along exposed segments of the surface of the winding in a direction transverse to its turns. When the sliding brush rests on one conductive segment of the winding, a current path to the electrical load is established. If the brush rests upon two exposed segments at the same time, an additional current flow path is established in the portion of the winding between the two exposed segments and through the brush. Such a current which flows through a portion of a winding is a short-circuit current, which is undesirable and in effect can lead to the destruction of the transformer. If the brush does not contact an exposed segment of a winding, an open circuit exists and then no current is supplied to the load.

Advantageously, as described and claimed in my application Ser. No. 890,523 entitled "Variable Transformer Method and Apparatus for Preventing Short-Circuit Current Flow", now issued as U.S. Pat. No. 4,189,672, in order to make a smooth transition and provide a continuously adjustable alternating current voltage to the load, a plurality of brushes may be provided for contacting exposed segments of the turns of the winding along separate traverse paths, with the brushes being moved simultaneously to insure that one of the brushes is always in contact with a winding in order to deliver alternating current (AC) to the load. The short-circuit current flow is prevented, when each brush is in contact with respective exposed segments of a winding at different potentials, for both brushes are connected to the load through circuits containing rectifier means. Therefore, a respective one of the two brushes which is at the lower potential is isolated from the alternating current load circuit by the non-initiation of conduction through the respective rectifier means.

SUMMARY

It is an object of the present invention to provide a novel continuously variable-voltage direct-current power supply which is considerably more economic in utilization of steel and copper for supplying an adjustable voltage to a direct current (DC) load circuit.

Among the numerous advantages of this invention are those resulting from the fact that it provides economically attractive DC power supplies having single-phase or multiphase variable transformers of the type described in said application capable of controlling the delivery of large amounts of DC electrical power to DC loads, for example, to control the speed of large DC motors.

In carrying out this invention in one illustrative embodiment thereof, a continuously variable voltage direct-current power supply is provided having a variable transformer with a core of magnetically permeable material which is encircled by at least one electrical winding with segments of the turns of the winding being exposed along two spaced traverse paths so that electrical contact can be made with the turns of the winding at the various exposed segments. First and second brushes of high electrical conductivity are positioned on movable carriage means for simultaneously traversing the first and second brushes along these traverse paths with at least one of the brushes always contacting an exposed segment of the winding. First and second rectifier circuits couple the first and second electrically conducting brushes, respectively to the same electrical load circuit, for example, such as a DC motor. These first and second bridge rectifier circuits are connected in parallel between the brushes and the load.

Turn-to-turn short cirsuit current between the adjoining turns contacted by the brushes is eliminated by employing a transformer winding having a turn-to-turn voltage which is less than the forward voltage drop through two or more rectifiers in series with the load. Turn-to-turn current can only flow from one brush to the other through at least two rectifiers in the forward direction and the resistance of the electrical load only if conduction is initiated in the two rectifiers. Where a higher turn-to-turn voltage is desired to be utilized, then more than one rectifier can be connected in series in each branch of the rectifier circuits.

In instances where the DC load is capable of functioning with a relatively minor component of superimposed AC current (approximately one percent or so) then irrespective of the turn-to-turn voltage and of the number of rectifiers in series, the turn-to-turn current circulating from one brush to the other through the load is held to an acceptably low value by the load resistance itself.

The variable transformer which is included in this DC power supply may have both primary and secondary windings or may have an autotransformer winding. Single-phase or multi-phase variable transformers can be used in this DC power supply.

Advantageous DC power control can be accomplished on a considerably more attractive economic basis by using a variable voltage DC power supply embodying this invention than by using conventional systems available today. For example, the speed of a large DC motor can be controlled very conveniently by employing this invention.

It is to be understood that the term "rectifier" is being used generically in this specification and in the claims to describe a unidirectional conduction device. There are various kinds of unidirectional conduction devices including solid-state ones and gaseous ones. The solid-state rectifiers are often called "diodes". Thus, the term "rectifier" is to be interpreted broadly to include diodes as well as other types of unidirectional conduction devices.

It is to be understood that the term "continuously variable" is being used in the specification and in the claims in a practical (not literal) sense. For example, if the maximum output voltage from a variable transformer winding is 120 volts and if the winding contains 100 turns, then the turn-to-turn voltage differential is 1.2 volts. Therefore, the output voltage is variable in increments of 1.2 volts, but it is called a continuously variable voltage, because for practical purposes the increments of variation are so small as to be effectively continuous. If smaller increments of voltage variation are desired in a particular installation, then the variable transformer is provided with a winding having more turns to cover the same voltage range, so that the turn-to-turn voltage differential is correspondingly reduced. For example, if the winding is provided with 200 turns to cover a range of 120 volts, then the output voltage is variable in increments of 0.6 volts, and so forth.

BRIEF DESCRIPTION OF THE DRAWINGS

The invention, together with further aspects, objects and advantages thereof will be better understood from the following description considered in connection with the accompanying drawings, in which the same reference numbers are used to indicate similar components throughout the various FIGURES.

DESCRIPTION OF THE PREFERRED EMBODIMENTS

Figures 1, 2:
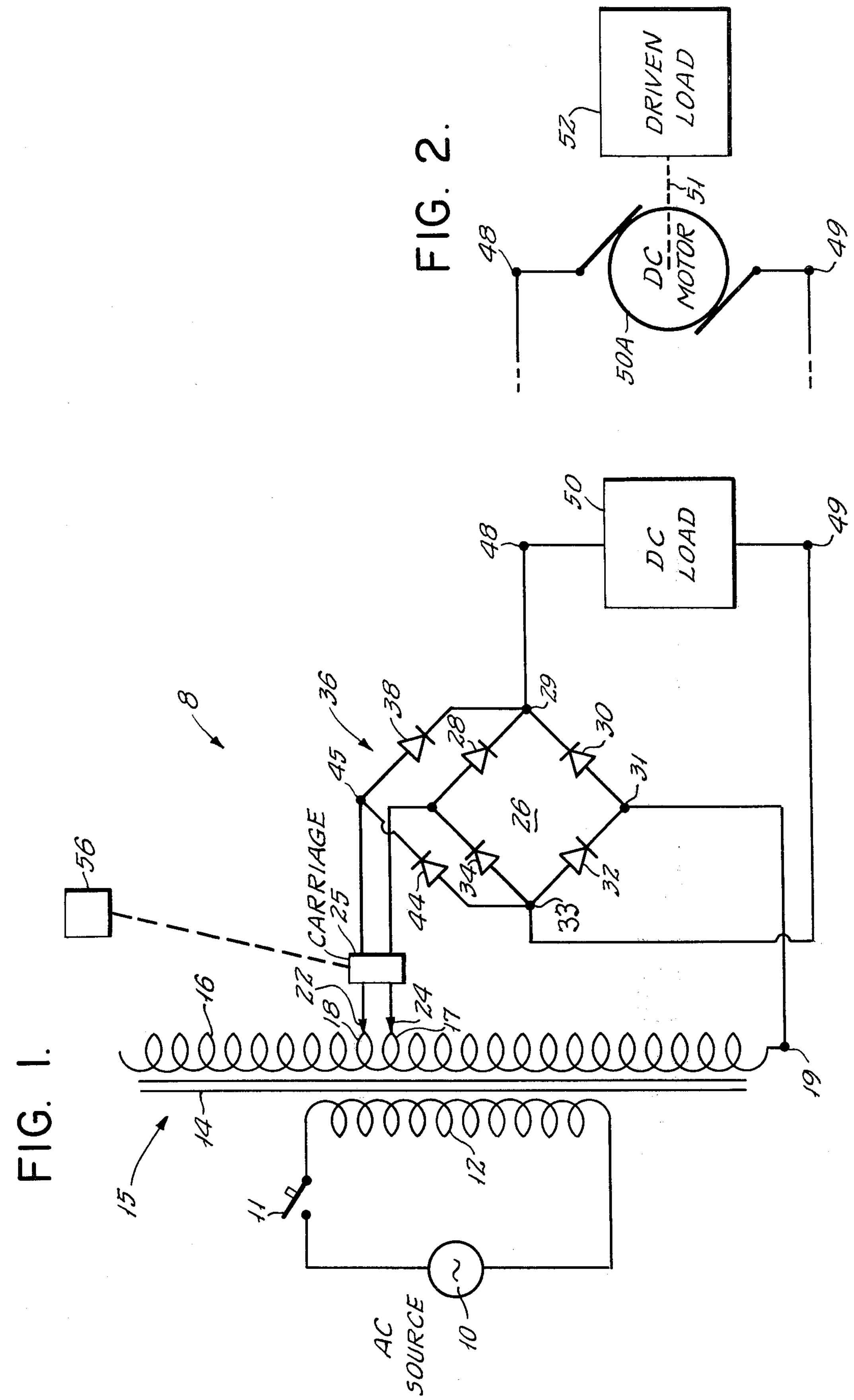
FIG. 1 is a schematic electrical circuit diagram of a continuously variable voltage direct-current power supply embodying the present invention.
FIG. 2 illustrates that the variable DC voltage power supply of FIG. 1 may advantageously be used to control the speed of a DC motor.

Referring now to FIG. 1, the variable voltage DC power supply as a whole is generally indicated by the reference number 8. An alternating current source 10 is connected through an ON-OFF switch 11 to the primary winding 12 of an adjustable transformer, referred to generally with the reference number 15, having a permeable magnetic core 14 and a secondary winding 16. The primary winding 12 and secondary winding 16 are wound on the core 14, and the alternating current source 10 applied to the primary winding 12 induces an alternating electromotive force (emf) in the secondary winding 16. This is a variable transformer as described and claimed in the patent identified above, in which the primary and secondary windings are separated and are electrically insulated from each other. But, it is to be understood that a variable transformer having only one winding, a part which serves as both the primary and secondary, as described and claimed in said patent and which is called an autotransformer, may also be employed in a variable-voltage direct-current power supply embodying the present invention, as shown at 15A in FIG. 3.

The magnetically permeable core 14 is formed of conventional laminated transformer iron. This core 14 may be generally O-shaped in which case the two windings individually encircle the respective legs of the core or may be a so-called shell configuration in which both windings encircle the elongated central leg of the shell core. In the case of a variable autotransformer as shown at 15A in FIG. 3, it is my preference that a shell-type core 14 be used.

The output voltage from the transformer 15 or 15A (FIG. 3) is taken across all or a portion of the winding 16 (or 16A, FIG. 3) by a pair of highly conductive brushes 22 and 24. These brushes are shown in a position in which they contact turns 18 and 17, respectively, of the winding 16 and 16A. As will be seen in FIG. 4, the brushes 22 and 24 traverse the winding 16 or 16A along two separate traverse paths extending in spaced parallel relationship along the winding, and the brushes are simultaneously moved along these two traverse paths by a carriage 25 on which the brushes are mounted.

The segments of the turns of the winding 16 and 16A which are adapted to be contacted by the brushes 22 and 24 are exposed so that electrical contact can be made by the brushes with the turns of the winding. The brush 22 is shown in contact with an exposed segment of the turn 18, and the brush 24 in contact with an exposed segment of the turn 17 of the winding 16 or 16A. In order to vary the voltage supplied by the transformer 15 or 15A, the brushes are simultaneously moved along their respective traverse paths. Therefore, one or the other of the brushes will always be in contact with a turn of the winding 16 or 16A. From time-to-time during such voltage changing movement both brushes will simultaneously come into contact with respective segments causing either brush to be at a greater or lesser potential than the other brush.

Brush 24 is coupled by a bridge rectifier circuit 26 having rectifiers 28, 30, 32 and 34 to a load circuit 50. The other brush 22 is also coupled to this same load circuit 50 by a second bridge rectifier 36 having rectifiers 38, 44, 30 and 32. In other words, these two bridge rectifier circuits 26 and 36 have rectifiers 30 and 32 in common with each other, and therefore, they may be said to be in pick-a-back relationship one with respect to the other. The bridge rectifiers 26 and 36 are connected in parallel relationship between the brushes 24 and 22, respectively and the load circuit 50.

Accordingly, the output voltage of the winding 16 or 16A between the turn 17 and its lower end or terminal 19 is applied across junctions 35 and 31 of the bridge 26, while the output of this bridge 26 is supplied from the other respective junctions 29 and 33 to the load 50. The output voltage of the winding 16 or 16A between the turn 18 and the lower end 19 is applied across the junctions 45 and 31 of the bridge rectifier circuit 36, while the output from the bridge 36 to the load is supplied from the junctions 33 and 29 which are in common with the other bridge 26.

The bridge rectifier circuits 26 and 36 are connected in parallel, with the rectifier 30 being in opposition to rectifiers 28 and 38, and also with the rectifier 32 in opposition to rectifiers 34 and 44.

Since the width of the high conductivity brushes in the direction of the traverse path along the winding 16 or 16A is less than the spacing between two sequential exposed segments along that path, no single brush is able simultaneously to come into contact with two adjacent turns, thereby avoiding any short-circuiting of any of the turns through a single brush.

However, with the two traverse paths along the winding, the two brushes are positioned relative to each other and relative to the exposed segments of the two traverse paths such that at all times at least one or possibly both of these brushes are in contact with an exposed segment or segments of the winding. When only one brush contacts an exposed segment, only that brush provides a current through its associated full-wave rectifier to the output circuit or load 50. However, when both brushes contact respective exposed segments of the winding, with the segments being at different potentials, the possibility of short-circuiting current flow through the turn or turns between the respective segments and the two brushes is advantageously prevented or rendered insignificant, as will be explained below in connection with FIG. 4.

Figure 3A:
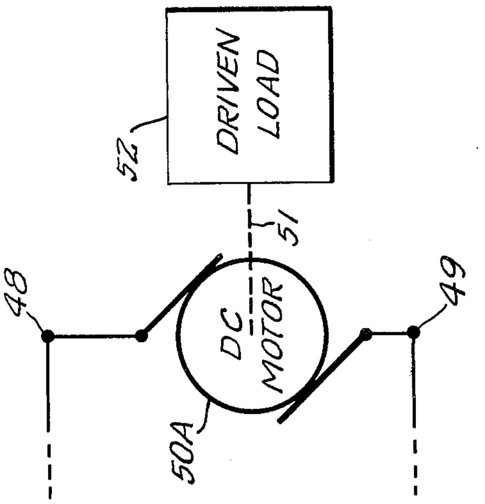
FIG. 3A shows that the variable DC voltage power supply of FIG. 3 can advantageously be used to control the speed of a DC motor.
Figure 3:
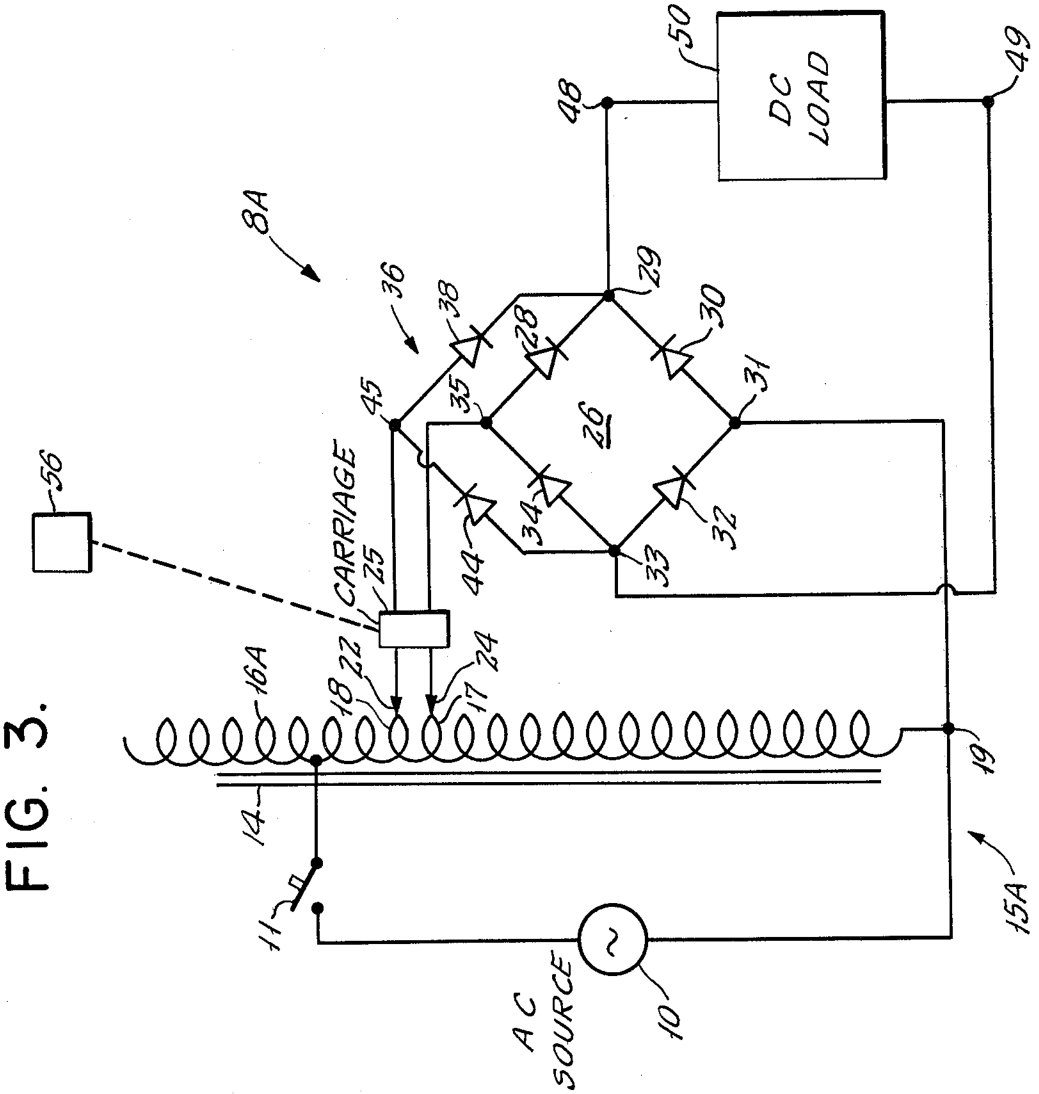
FIG. 3 is a schematic electrical circuit diagram of a continuously variable voltage direct-current power supply similar to that shown in FIGS. 1 or 2, but it includes an autotransformer instead of a transformer having primary and secondary windings.

FIGS. 2 and 3A show that the DC load can advantageously be a DC motor 50A whose speed is controlled by the variable power supply 8 or 8A. The controlled motor is mechanically connected as shown by the dashed line 51 to a driven load 52.

Figure 4:
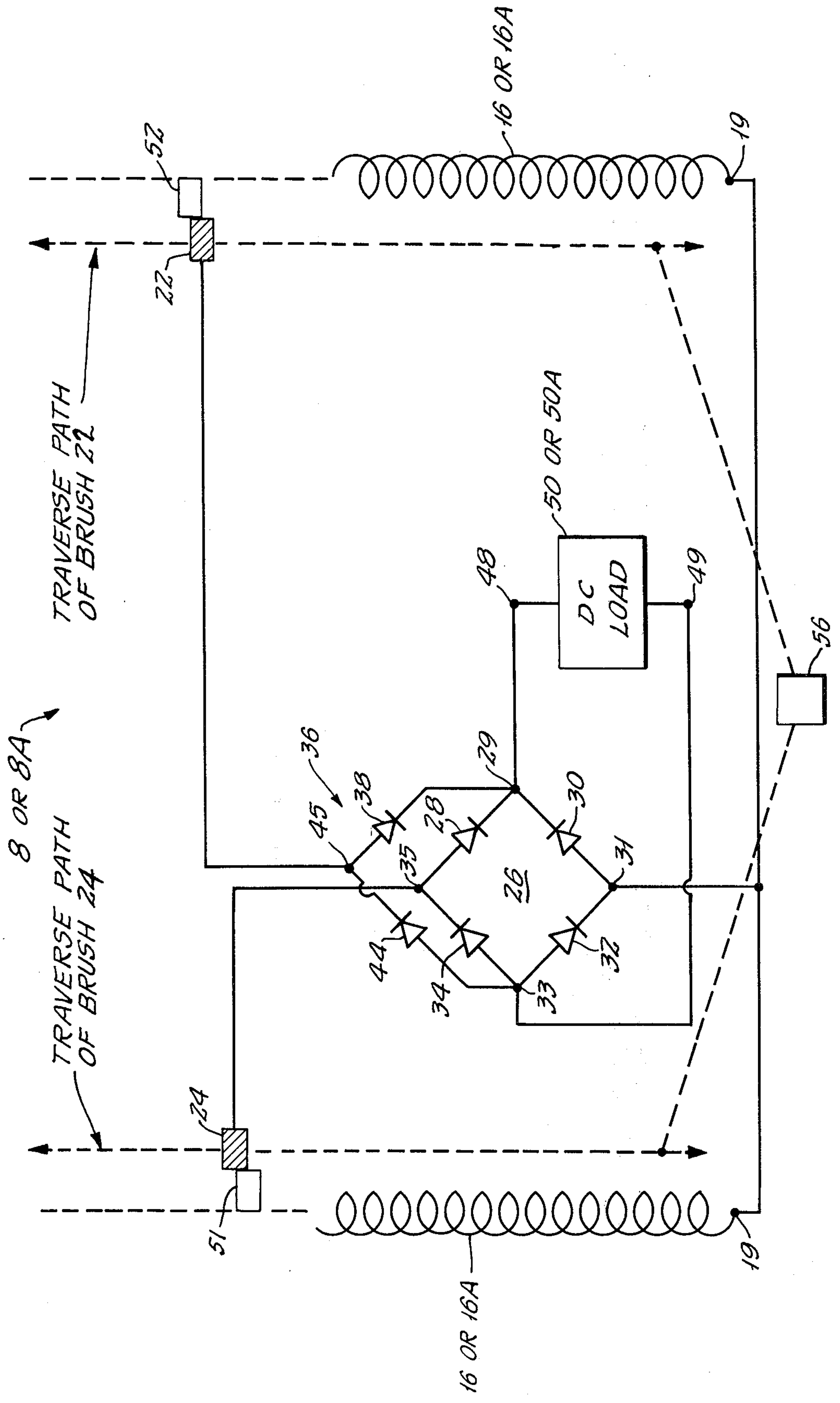
FIG. 4 is a schematic electrical circuit diagram illustrating one set of adjusted positions of the high conductivity brushes relative to exposed segments of a winding, which is helpful in explaining the operation of these variable-voltage direct-current power supplies.

FIG. 4 illustrates the situation where brush 24 contacts an exposed segment 51 of the winding 16 or 16A while brush 22 contacts another exposed segment 52 of this winding. Since the exposed segment 52 is further along this winding than the exposed segment 51, a higher potential exists on the brush 22 than on the brush 24. The higher potential of the brush 22 is applied to the rectifier bridge 36 thereby applying a full-wave rectified DC output voltage to the terminals 48 and 49 of the load 50.

During positive half cycles of the alternating current (AC) voltage from the exposed segment 52, rectifier elements 38 and 32 conduct, while during negative half cycles of the AC voltage it is the elements 30 and 44 which conduct. In each half cycle the rectified DC current is passing through the load 50 and 50A in series with the respective rectifiers which were just enumerated.

Meanwhile the voltage differential between the exposed segments 51 and 52 can not cause short-circuit conduction through either of the rectifier bridges 26 or 36 because of their mutual blocking relationship with respect to all possible paths between the two brushes 22 and 24. Short-circuit current can not flow between the brushes 22 and 24 because conduction of such short-circuit current through rectifier 38 would be blocked by opposed rectifiers 28 and 30 of bridge 26 while short-circuit currents through rectifier 44 of rectifier bridge 36 would be blocked by opposed rectifiers 32 and 34. Short-circuit currents in the opposite direction from the brush 24 are likewise blocked by the various elements of rectifier bridge 36. Accordingly, any such current from one brush to the other would have to flow through the load (which can be prevented, if desired), and any such flow through the load is rendered insignificant by the load impedance, and therefore by definition is not a short-circuit current.

In those situations where the DC load 50 or 50A can function with a relatively minor superimposed component of AC current, then the turn-to-turn AC voltage differential, i.e., the difference in AC voltage between the exposed segments 51 and 52, can be made larger, if desired, than the voltage required to initiate conduction ("turn-on voltage") through the rectifiers in series with the load 50 or 50A. In such a case there will be a relatively small AC current flowing from one brush to the other through the load. This AC current component is very small, because the voltage difference (turn-to-turn voltage) between the exposed segments 51 and 52 is relatively small, while the impedance of the load 50 or 50A by comparison is relatively large.

In those instances where it is desired to prevent any such minimal AC current flow through the load, the turn-on voltage of the rectifiers in series with the load is made greater than the turn-to-turn AC voltage difference. For increasing the effective turn-on voltage of the rectifiers, each arm of the rectifier bridge circuits 26 and 36 may include a plurality of rectifiers in series or a series-parallel arrangement of multiple rectifiers.

The situation will exactly reverse when brush 24 contacts an exposed segment which is at a higher potential than the segment being contacted by the brush 22. With the higher potential being applied to brush 24, rectifier bridge 26 becomes active, while the rectifier bridge 36 becomes inactive and mutually interacts with the other bridge to block any short-circuit current flow between the brushes.

Accordingly, in operations at all times one bridge is active, and the two bridges are in mutually blocking relationship with respect to short-circuit current flow. Any minor AC current component through the load can be prevented, if desired, by making the turn-on voltage of the rectifiers in series with the load greater than the turn-to-turn voltage of the variable transformer winding, as discussed above.

Figure 5:
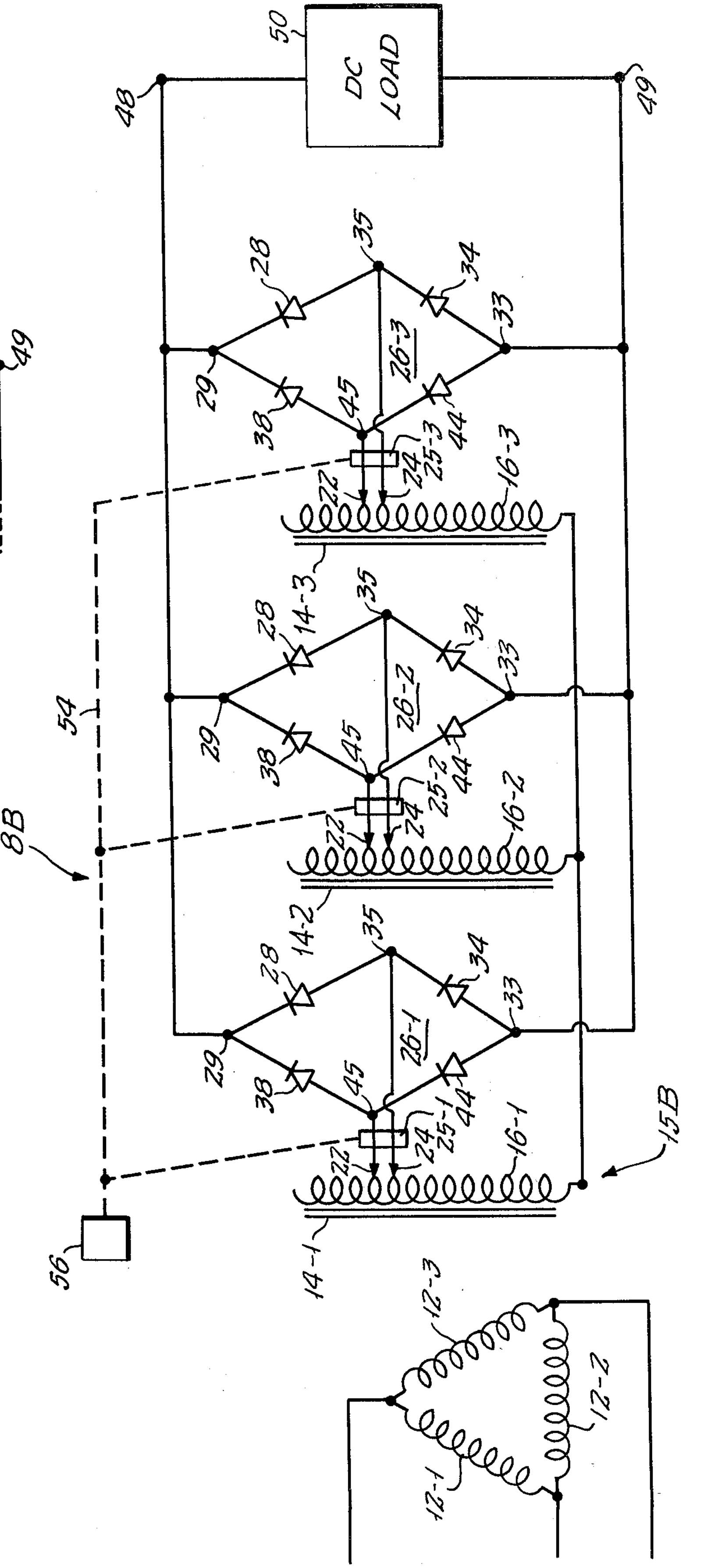
FIG. 5 is a schematic electrical circuit diagram of a continuously variable voltage DC power supply embodying the invention and in which a three-phase variable transformer is incorporated.

It is to be understood that any appropriate DC electrical load can be connected between the output terminals 48 and 49 of the variable DC power supply 8 or 8A or 8B (FIG. 5). Very large amounts of DC electrical power can be conveniently controlled by a variable voltage DC power supply embodying this invention. Where very large amounts of DC power are being controlled it is most advantageous to use a multi-phase power supply 8B as shown in FIG. 5.

In the variable DC power supply 8B as shown in FIG. 5 there is a three-phase variable transformer 15B such as described and claimed in my application identified above. The primary side of this transformer 15B may be either delta primary or Y-connected. My preference is to use a delta connection, as shown, because each primary winding 12-1, 12-2, 12-3 carries less current at a higher voltage than occurs in a Y-connected primary of the same KVA rating.

The three secondary windings 16-1, 16-2, and 16-3 are located on three core legs 14-1, 14-2, and 14-3, respectively, of the transformer 15B. There are three full-wave rectifier bridges 26-1, 26-2, and 26-3, associated with the respective windings 16-1, 16-2, 16-3. The three pairs of the brushes 22 and 24 are mounted on carriage means 25-1, 25-2 and 25-3, which may comprise one large carriage or three smaller carriages mechanically ganged together so that the pairs of brushes are simultaneously and correspondingly moved for changing the DC voltage output at the terminals 48 and 49. The mechanical ganging of the carriage means 25 is indicated by the dashed line 54.

The carriage means 25 in each of the power supplies 8, 8A and 8B may be mechanically moved along the respective traverse paths by any suitable mechanical traveller or linkage arrangement, as shown in the patent identified above, with the carriage means being slidable along guideways or guide rods. For example, feed screws, movable arms, push rods, sprockets and chains, and so forth can be used for sliding the carriage means 25 along the guideways or guide rods, and such carriage moving means for simultaneously correspondingly moving the pair(s) of brushes 22 and 24 is shown at 56.

The operating characteristics explained with the diagram shown in FIG. 4 are also applicable to the power supply 8B of FIG. 5. In other words, no short-circuit current can flow from one of the brushes 22 and 24 in each pair to the other brush in that pair. If it is desired to prevent any minor AC component from flowing through the load, then the turn-on voltage of the rectifiers in series with the load is arranged to be greater than the turn-to-turn voltage in the respective windings 16-1, 16-2, and 16-3.

Figure 6:
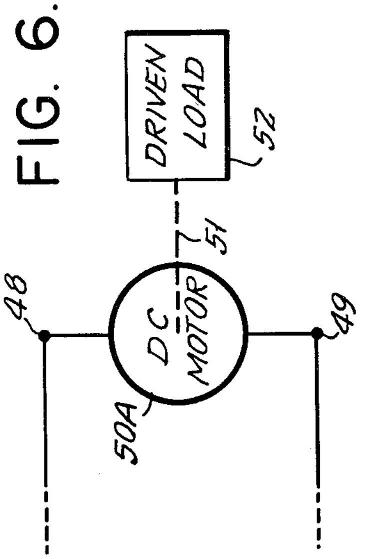
FIG. 6 shows that the variable DC voltage power supply of FIG. 5 may advantageously be used to control the speed of a large DC motor.

The DC load connected to the output terminals 48 and 49 of the supply 8B can be any appropriate load. As shown in FIG. 6, the variable voltage DC supply 8B can be used to advantage for controlling the speed of a large DC motor.

Accordingly, continuously adjustable voltage direct-current power supplies are provided which eliminate any short-circuit current flow problems between the brushes. A full-wave rectified output is thereby provided which is particularly suited for supplying large amounts of DC power. It will be understood that filtering of the full-wave rectified output voltage may be provided if desired. Electrical filtering circuits for smoothing out the ripple in a DC voltage are well known and need not be described here.

In operation the DC output voltage and hence the output power is conveniently varied by moving the pair or pairs of brushes 22 and 24 by moving the carriage means 25.

These DC power supplies do not require extra heat dissipation elements for dissipating the heat caused by wasted energy arising from short-circuit currents, because such short-circuit currents do not occur. Thus, this invention advantageously enables the economic construction of very large power, adjustable-voltage DC power supplies using a single large variable transformer, which may be single phase or poly-phase.

For any given amount of variable-voltage DC power output, the employment of power supplies embodying this invention will provide great savings in steel, copper, and labor for assembly as compared with conventional systems in use today.

For the most efficient utilization of materials, the variable voltage DC power supplies 8, 8A or 8B are sized to supply full rated current to the load and to be operating at their own full power output rating when the pair or pairs of movable contacts 22 and 24 are moved to the top of the respective winding(s) 16, 16A or 16-1, 16-2, 16-3.

It is to be understood that each rectifier 28, 30, 32, 34, 38 and 44 in the respective arms of the various rectifier bridges may itself comprise a plurality of individual rectifiers connected in series or connected in parallel or connected in parallel strings of series-connected units as may be desired to meet particular turn-on voltage requirements or high peak inverse voltage rating requirements, and/or high current-carrying requirements of a particular installation.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention.

What is claimed is:

1. An adjustable-voltage direct current (DC) power supply having a variable transformer with a core of magnetically permeable material which is encircled by at least one electrical winding with segments of said winding being exposed for electrical contact therewith and having first and second highly conductive electrical brushes with means for simultaneously traversing said first and second brushes along first and second traverse paths, respectively, along said winding with at least one of said brushes always contacting an exposed segment of said winding for delivering alternating current (AC) from said brushes, said DC power supply comprising:

first and second output terminals adapted to be connected to a DC electrical load, first unidirectional conduction means connected in the forward direction from the first brush to the first output terminal, second unidirectional conduction means connected in the forward direction from the second output terminal to said first brush, third unidirectional conduction means connected in the forward direction from the second brush to the first output terminal, fourth unidirectional conduction means connected in the forward direction from the second output terminal to said second brush, fifth unidirectional conduction means connected in the forward direction from a terminal of said electrical winding to the first output terminal, sixth unidirectional conduction means connected from the second output terminal to said terminal of said electrical winding, AC current being prevented from flowing from one brush to another through said first and third unidirectional conduction means in series by their mutually blocking relationship, AC current being prevented from flowing from one brush to another through said second and fourth unidirectional conduction means in series by their mutually blocking relationship, whereby DC electrical power full-wave rectified is delivered to the load and the voltage of said DC electrical power can be continuously varied by simultaneously traversing said first and second brushes along said first and second traverse paths, respectively, and whereby said DC electrical power is delivered by whichever of said brushes happens to be in contact with an exposed segment of the winding at the higher AC voltage.

2. An adjustable-voltage DC power supply, as claimed in claim 1, in which:

the forward turn-on voltage of said first and fourth unidirectional conduction means in series is greater than the maximum AC voltage difference occurring between said brushes for preventing AC current from flowing through said brushes and in the forward direction through said first and fourth unidirectional conduction means in series with any DC load connected between said output terminals, and the forward turn-on voltage of said second and third unidirectional conduction means in series is greater than the maximum AC voltage difference occurring between said brushes for preventing AC current from flowing through said brushes and in the forward direction through said second and third unidirectional conduction means in series with any DC load connected between said output terminals.

3. A DC motor speed control having a continuously variable transformer with a core of ferromagnetic material which is encircled by at least one electrical winding with segments of said winding being exposed along two respective traverse paths for electrical contact therewith, with said first and second highly conductive electrical brushes and means for simultaneously traversing said first and second brushes along the winding with at least one of said brushes always engaging an exposed segment of said winding, said DC motor speed control comprising:

first and second output terminals adapted to be connected to a DC motor, first unidirectional conduction means connected in the forward direction from the first brush to the first output terminal, second unidirectional conduction means connected in the forward direction from the second output terminal to said first brush, third unidirectional conduction means connected in the forward direction from the second brush to the first output terminal, fourth unidirectional conduction means connected in the forward direction from the second output terminal to said second brush, fifth unidirectional conduction means connected in the forward direction from a terminal of said electrical winding to the first output terminal, sixth unidirectional conduction means connected from the second output terminal to said terminal of said electrical winding, AC current being prevented from flowing from one brush to another through said first and third unidirectional conduction means in series by their mutually blocking relationship, AC current being prevented from flowing from one brush to another through said second and fourth unidirectional conduction means in series by their mutually blocking relationship, the only path for AC current to flow from brush to the other being in the forward direction through two unidirectional conduction means in series with the DC motor and therefore being preventable by making the forward turn-on voltage of said two unidirectional conduction means greater than the maximum voltage difference occurring between said brushes, whereby DC electrical power full-wave rectified is delivered to the DC motor and the voltage of said DC electrical power can be continuously varied by simultaneously traversing said first and second brushes along said first and second traverse paths, respectively, for controlling the speed of said DC motor.

4. A continuously adjustable-voltage direct current (DC) power supply having a three-phase variable transformer with a core of ferromagnetic material which is encircled by three secondary windings with segments of each of said windings being exposed for electrical contact therewith and each having a pair of highly conductive electrical brushes with means for simultaneously traversing said pair of brushes along first and second traverse paths, respectively, along each of said windings with at least one brush of each pair always contacting an exposed segment of the respective winding for delivering three-phase alternating current (AC) from said three pairs of brushes, said DC power supply comprising:

first and second output terminals adapted for connection to a DC electrical load, a three-phase primary winding magnetically coupled to said core, said three secondary windings each having first and second ends, said first ends of said three secondary windings being directly connected together by a common connection, said second ends of said three secondary windings being unconnected, said three pairs of brushes including first and second brushes traversing a first of the secondary windings, third and fourth brushes traversing a second of the secondary windings and fifth and sixth brushes traversing a third of said secondary windings, carriage means for traversing all of said pairs of brushes along the three respective secondary windings simultaneously equal amounts from the first ends of said windings toward the second ends, first unidirectional conduction means connected in the forward direction from the first brush to the first output terminal, second unidirectional conduction means connected in the forward direction from the second output terminal to said first brush, third unidirectional conduction means connected in the forward direction from the second brush to the first output terminal, fourth unidirectional conduction means connected in the forward direction from the second output terminal to said second brush, fifth unidirectional conduction means connected in the forward direction from the third brush to the first output terminal, sixth unidirectional conduction means connected in the forward direction from the second output terminal to said third brush, seventh unidirectional conduction means connected in the forward direction from the fourth brush to the first output terminal, eighth unidirectional conduction means connected in the forward direction from the second output terminal to said fourth brush, ninth unidirectional conduction means connected to the forward direction from the fifth brush to the first output terminal, tenth unidirectional conduction means connected in the forward direction from the second output terminal to said fifth brush, eleventh unidirectional conduction means connected in the forward direction from the sixth brush to the first output terminal, and twelfth unidirectional conduction means connected in the forward direction from the second output terminal to said sixth brush, thereby delivering a continuously variable full-wave rectified DC voltage to said first and second output terminals.

5. An adjustable-voltage direct current (DC) power supply having a variable transformer with a core of ferromagnetic material which is encircled by at least one electrical winding with segments of said winding being exposed for electrical contact therewith and having first and second highly conductive electrical brushes with means for simultaneously traversing said first and second brushes along first and second traverse paths, respectively, along said winding with at least one of said brushes always contacting an exposed segment of said winding for delivering alternating current (AC) from said brushes, said DC power supply comprising:

first and second output terminals adapted to be connected to a DC electrical load, first unidirectional conduction means connected in the forward direction from the first brush to the first output terminal, second unidirectional conduction means connected in the forward direction from the second output terminal to said first brush, third unidirectional conduction means connected in the forward direction from the second brush to the first output terminal, fourth unidirectional conduction means connected in the forward direction from the second output terminal to said second brush, fifth unidirectional conduction means connected in the forward direction from a terminal of said electrical winding to the first output terminal, sixth unidirectional conduction means connected from the second output terminal to said terminal of said electrical winding, said third, fourth, fifth and sixth unidirectional conduction means forming a full-wave rectifier bridge, said first and second unidirectional conduction means forming a second full-wave rectifier bridge in pick-a-back relationship with said full-wave rectifier bridge, AC current being prevented from flowing from one brush to another through said first and third unidirectional conduction means in series by their mutually blocking relationship, AC current being prevented from flowing from one brush to another through said second and fourth unidirectional conduction means in series by their mutually blocking relationship, whereby DC electrical power full-wave rectified is delivered to the load and the voltage of said DC electrical power can be continuously varied by simultaneously traversing said first and second brushes along said first and second traverse paths, respectively, and whereby said full-wave DC electrical power is delivered by whichever of said brushes happens to be in contact with an exposed segment of the winding at the higher AC voltage.

* * * * *